United States Patent
Dede (10) Patent No.: US 10,523,007 B2
(45) Date of Patent: Dec. 31, 2019

(54) FACILITY WITH DECOUPLED ADAPTIVE SENSOR SYSTEM

(71) Applicant: Toyota Motor Engineering & Manufacturing North America, Inc., Erlanger, KY (US)

(72) Inventor: Ercan Mehmet Dede, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 379 days.

(21) Appl. No.: 15/448,106

(22) Filed: Mar. 2, 2017

(65) Prior Publication Data
US 2018/0138712 A1 May 17, 2018

Related U.S. Application Data

(60) Provisional application No. 62/423,378, filed on Nov. 17, 2016.

(51) Int. Cl.
*H02J 3/38* (2006.01)
*H02N 11/00* (2006.01)
*H02J 7/32* (2006.01)

(52) U.S. Cl.
CPC .............. *H02J 3/382* (2013.01); *H02J 7/32* (2013.01); *H02N 11/002* (2013.01); *Y02B 40/90* (2013.01)

(58) Field of Classification Search
CPC .......... H02J 3/382; H02J 7/32; H02N 11/002; Y02B 40/90
See application file for complete search history.

(56) References Cited

U.S. PATENT DOCUMENTS 7,870,080 B2 * 1/2011 Budike, Jr. ............ G01D 4/004
705/412
7,977,852 B2 7/2011 Ward et al.
(Continued)

OTHER PUBLICATIONS

Embedded Computing Design, "Global Energy Harvesting/ Regeneration for Electric Vehicles Land, Water & Air 2015-2025", Retrieved from the Internet: <http://embedded-computing.com/news/global-water-air-2015-2025/#>, [retrieved Mar. 1, 2017] (9 pages).
(Continued)

*Primary Examiner* — Jared Fureman
*Assistant Examiner* — Michael J Warmflash
(74) *Attorney, Agent, or Firm* — Christopher G. Darrow; Darrow Mustafa PC (57) ABSTRACT

A facility can include a main power source. One or more facility systems can be operatively connected to the main power source. The facility can include a plurality of sensors. The plurality of sensors can be configured to acquire facility data. A plurality of energy harvesters can be operatively connected to the plurality of sensors. The plurality of energy harvesters can be configured to convert energy received in one form into another form of energy. The plurality of energy harvesters can be operatively connected to supply energy to the plurality of sensors. The plurality of sensors can be exclusively powered by energy supplied by the plurality of energy harvesters. Thus, the plurality of sensors are decoupled from the main power source. The facility can be a fixed facility or a mobile facility. The facility can be used for disaster relief or other applications.

20 Claims, 3 Drawing Sheets

(56) References Cited

U.S. PATENT DOCUMENTS

| | | | |
|---|---|---|---|
| 8,080,920 B2 | 12/2011 | Andosca et al. | |
| 8,364,287 B2* | 1/2013 | Pearson | H01M 8/04619 |
| | | | 320/101 |
| 8,552,597 B2 | 10/2013 | Song et al. | |
| 8,634,980 B1 | 1/2014 | Urmson et al. | |
| 9,197,143 B1 | 11/2015 | Townsend et al. | |
| 2006/0176158 A1* | 8/2006 | Fleming | B60R 16/0232 |
| | | | 340/425.5 |
| 2012/0249065 A1* | 10/2012 | Bissonette | H02J 3/381 |
| | | | 320/109 |
| 2013/0009469 A1* | 1/2013 | Gillett | H02J 3/30 |
| | | | 307/25 |
| 2015/0115868 A1* | 4/2015 | Ping | H02J 7/34 |
| | | | 320/101 |
| 2015/0158486 A1 | 6/2015 | Healey et al. | |

OTHER PUBLICATIONS

Acute Market Reports, "Energy Harvesting/ Regeneration for Electric Vehicles Land, Water & Air 2015-2025", Retrieved from the Internet: <http://www.acutemarketreports.com/report/energy-harvesting-regeneration-for-electric-vehicles-land-water-and-air-2015-2025>, [retrieved Mar. 1, 2017] (1 page).

* cited by examiner

FACILITY WITH DECOUPLED ADAPTIVE SENSOR SYSTEM

CROSS REFERENCE TO RELATED APPLICATIONS

This application claims the benefit of U.S. Provisional Application No. 62/423,378, filed on Nov. 17, 2016, which is incorporated herein by reference in its entirety.

FIELD

The subject matter described herein relates in general to a facility and, more particularly, to the operation of a facility.

BACKGROUND

In a manufacturing process, a series or sequence of activities can be performed to produce a product or to achieve some result. Each activity can have one or more process variables, which can affect the efficiency or yield of the particular activity. In addition, the performance of one activity can affect the performance or requirements of another activity in the overall process. Thus, the adjustment of the value or set point of any of the variables in any one activity can impact the manufacture of the final product.

SUMMARY

In one respect, the present disclosure is directed to a facility. The facility can include a main power source. The facility can include one or more facility systems. The one or more facility systems can be operatively connected to the main power source. The facility can include a plurality of sensors. The plurality of sensors can be configured to acquire facility data. The facility can include a plurality of energy harvesters. The plurality of energy harvesters can be operatively connected to the plurality of sensors. The plurality of energy harvesters can be configured to convert energy received in one form into another form of energy. The plurality of energy harvesters can be operatively connected to supply energy to the plurality of sensors. The plurality of sensors can be exclusively powered by energy supplied by the plurality of energy harvesters. As a result, the plurality of sensors can be decoupled from the main power source.

In another respect, the present disclosure is directed to a system. The system can include a mobile facility, a main power source, a plurality of facility systems, a plurality of sensors, a plurality of energy harvesters, and one or more processors. The plurality of facility systems can be operatively connected to the main power source. The plurality of sensors can be configured to acquire facility data. The plurality of sensors can be decoupled from the main power source. The plurality of energy harvesters can be operatively connected to the plurality of sensors. The plurality of energy harvesters can be configured to convert energy received in one form into another form of energy. The plurality of sensors can be exclusively powered by energy supplied by the plurality of energy harvesters. Thus, the plurality of sensors can be decoupled from the main power source. The one or more processors can be operatively connected to the plurality of sensors. The one or more processors can be operatively connected to the plurality of energy harvesters. The one or more processors can be configured to receive facility data from the one or more sensors. The one or more sensors can be configured to determine whether an adjustment to one or more controls of one or more of the plurality of facility systems is needed based on the received facility data. The one or more sensors can be configured to, responsive to determining that an adjustment to one or more controls of one or more of the plurality of facility systems is needed, cause the one or more controls to be modified.

DETAILED DESCRIPTION

The subject matter described herein is directed to a facility. The facility can include a plurality of sensors configured to acquire facility data. The facility can include a plurality of energy harvesters operatively connected to the plurality of sensors. The plurality of energy harvesters can be configured to convert energy received in one form into another form of energy (e.g., electrical energy). The plurality of energy harvesters can be operatively connected to supply energy to the plurality of sensors. The plurality of sensors can be exclusively powered by energy supplied by the plurality of energy harvesters. As a result, the plurality of sensors can be decoupled from the main power source. Such arrangements can facilitate energy efficiency by using available energy sources to power sensors and/or can allow adaptive powering of the sensors.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
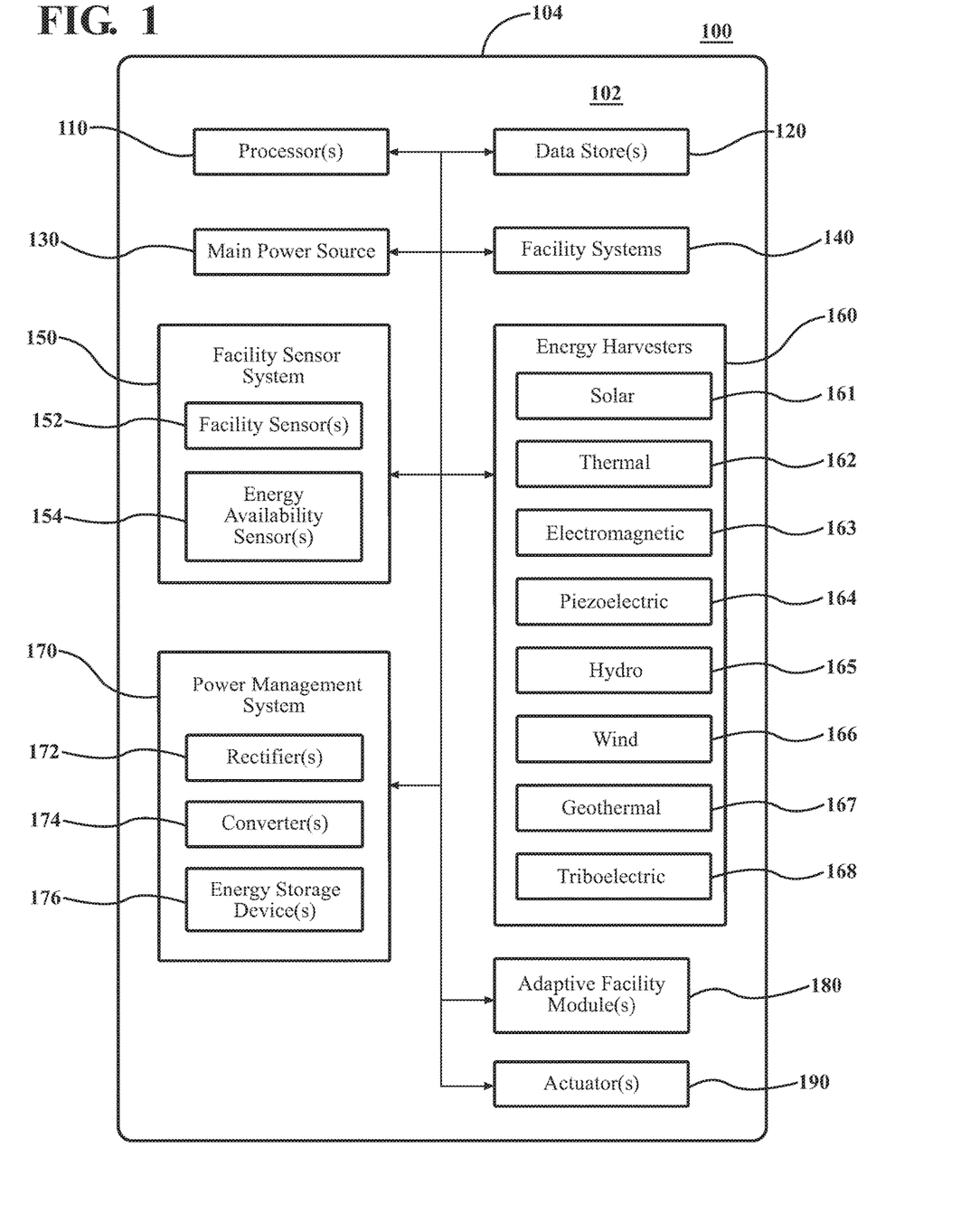
FIG. 1 is an example of a system for a facility.
Figure 2:
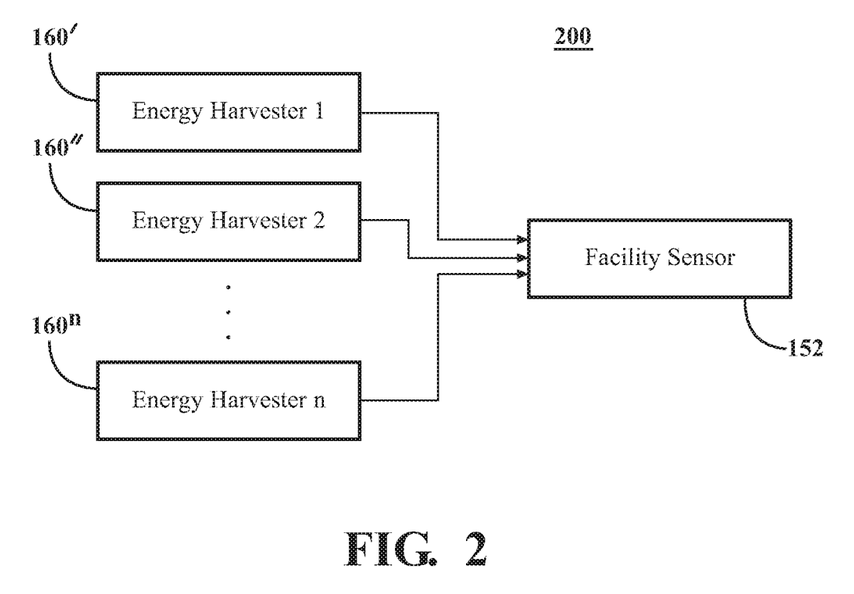
FIG. 2 is an example of a plurality of energy harvesters operatively connected to supply energy to a facility sensor.

Referring to FIG. 1, an example of a system 100 is shown. The system 100 includes a facility 102. The term "facility" means any structure (e.g., a building, plant, etc.) used, built, established, or installed for the performance of one or more specific activities or functions. The facility 102 can be used for various purposes, such as for commercial, industrial, disaster relief, aid, and/or humanitarian purposes, just to name a few possibilities. In one or more arrangements, the facility 102 can be at least partially defined by a housing 104.

In some arrangements, the facility 102 can be a permanent facility. A "permanent facility" is a structure that is not ordinarily meant to be moved. Examples of permanent facilities include a buildings or a manufacturing plant. In some arrangements, the facility 102 can be a mobile facility. A "mobile facility" is a structure that is relatively movable, that can be deployed and/or taken down relatively easily in different environments, and/or is intended for temporary use. An example of a mobile facility can be a pod, a trailer, or a stationary vehicle. A mobile facility might be deployed to provide temporary housing by a governmental entity (e.g., Federal Emergency Management Agency) in a disaster relief area. As another example, the facility might be deployed to provide medical care to disaster victims. As a further example, the facility might be deployed to decontaminate victims of chemical and biological agents.

Some of the possible elements of the system 100 are shown in FIG. 1 and will now be described. The system 100 can include one or more processors 110, one or more data stores 120, one or more main power sources 130, one or more facility systems 140, a facility sensor system 150, a plurality of energy harvesters 160, one or more energy storage devices 176, and one or more adaptive facility modules 180. These various components can be operatively connected to each other in any suitable manner. The term "operatively connected," as used throughout this description, can include direct or indirect connections, including connections without direct physical contact.

It will be understood that it is not necessary for the system 100 to have all of the elements shown in FIG. 1 or described herein. The system 100 can have any combination of the various elements shown in FIG. 1. Further, the system 100 can have additional elements to those shown in FIG. 1. In some arrangements, the system 100 may not include one or more of the elements shown in FIG. 1. Further, the elements of the system 100 may be physically separated by large distances. It should be appreciated that although particular elements are separately defined, each or any of the elements or portions thereof may be otherwise combined or segregated via hardware and/or software. The various elements of the system 100 may be fully contained within the facility 102, or they can be distributed among a plurality of systems or locations.

The various components of the system 100 can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the system 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short or long range. For example, in terms of short range wireless networks, the communication network can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network can include a mobile, cellular, and/or satellite-based wireless network and support voice, video, text, and/or any combination thereof. Examples of long range wireless networks can include GSM, TDMA, CDMA, WCDMA networks or the like. The communication network can include wired communication links and/or wireless communication links. The communication network can include any combination of the above networks and/or other types of networks. The communication network can include one or more routers, one or more switches, one or more access points, one or more wireless access points, one or more transmitters, one or more receivers, one or more transceivers, and/or the like.

As noted above, the system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other, or one or more processors can work in combination with each other. In some arrangements, the processor(s) 110 can be located at or in the facility 102, or the processor(s) 110 can be located remote from the facility 102.

In some arrangements, the one or more processors 110 can be a part of a computing hub. Such a computing hub can also include other components, such as a wireless transmitter, receiver, and/or transceiver. The one or more processors 110 and/or the computing hub can, in some arrangements, be powered at least in part by the main power source 130. In some arrangements, the one or more processors 110 and/or the computing hub can be entirely powered by the main power source 130.

The system 100 can include one or more data stores 120 for storing one or more types of data. The data store 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby.

The system 100 can include a main power source 130. The main power source 130 can be operatively connected to supply power to one or more elements in the facility 102. For instance, the main power source 130 can be operatively connected to supply power to the one or more facility systems 140, lights, equipment, tools, instruments, security systems, heating ventilation air conditioning (HVAC) systems, etc. The main power source 130 can be any suitable source of power. For instance, the main power source 130 can be one or more generators. As another example, the main power source 130 can be one or more electrical grids (public or private), that is, an interconnected network for delivering electrical energy to consumers of electrical energy. As still another example, the main power source 130 can be one or more energy storage devices, such as one or more batteries.

The system 100 can include one or more facility systems 140. The facility systems 140 include anything relating to the facility 102. The facility systems 140 can directly or indirectly relate to the activities or functions occurring within the facility 102. In some instances, the facility systems 140 can be unrelated to the activities or functions occurring within the facility 102. The facility systems 140 can include automated equipment, tools, instruments, devices, processes, materials, inventory, storage, work flows, energy management, electrical systems, complex robotic systems, HVAC systems, and/or associated settings, characteristics, and/or controls just to name a few possibilities. Some non-limiting example settings include machine fluid flow rate, speed, temperature, light intensity, sound intensity, vibration intensity, and/or energy consumption.

As noted above, the system 100 can include a plurality of facility sensor system 150. The facility sensor system 150 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the facility sensor system 150 includes a plurality of sensors, the sensors can work independently from each other. Alternatively, two or more of the sensors can work in combination with each other. In such case, the two or more sensors can form a sensor network. The facility sensor system 150 and/or the one or more sensors can be operatively connected to the processor(s) 110, the data store(s) 120, and/or other element of the system 100 (including any of the elements shown in FIG. 1). The facility sensor system 150 can acquire data of at least a portion of the external environment of the system 100.

The facility sensor system 150 can include any suitable type of sensor. Various examples of different types of sensors will be described herein. However, it will be understood that the embodiments are not limited to the particular sensors described.

The facility sensor system 150 can include any suitable type of sensor. For instance, the facility sensor system 150 can include one or more facility sensors 152. The one or more facility sensors 152 can be configured to detect, determine, assess, measure, quantify and/or sense, directly or indirectly, information about the facility 102, one or more of the facility systems 140, and/or the performance thereof or portions thereof. The facility sensors 152 can be any type of sensor, now known or later developed. As another example, the facility sensor system 150 can include one or more energy availability sensors 154. The one or more energy availability sensors 154 can be configured to detect, determine, assess, measure, quantify and/or sense, directly or indirectly, information about energy sources within the detection range of the energy availability sensor(s) 154. In one or more arrangements, at least some of the one or more energy availability sensors 154 can be located within the facility 102. In one or more arrangements, at least some of the one or more energy availability sensors 154 can be located outside of the facility 102. The energy availability sensors 154 can be any type of sensor, now known or later developed.

In one or more arrangements, the facility sensor system 150 can be configured to transmit signals and the data they represent, wirelessly or otherwise, to the one or more processors 110 or a computing hub that include one or more of the processors 110. The facility sensor system 150 can wirelessly transmit these signals and the data they represent to a receiver and computer hub.

The system 100 can include a plurality of energy harvesters 160. The energy harvesters 160 can be any component or group of components capable of receiving energy in one form and converting the received energy into another form of energy. In one or more arrangements, the energy harvesters 160 can be any component or group of components configured to convert the received energy into electrical energy. The energy harvester 160 can include a light energy harvesting device 161, a thermal energy harvesting device 162, an electromagnetic energy harvesting device 163, a piezoelectric energy harvesting device 164, a hydro energy harvesting device 165, a wind energy harvesting device 166, a geothermal energy harvesting device 167, and/or a triboelectric harvesting device 168, just to name a few possibilities.

In some instances, one or more piezoelectric energy harvesting devices 164 can be used to harvest vibrational energy. For instance, one or more facility systems 140 (or portions, aspects, or components thereof) can produce vibrations or heat. One or more piezoelectric energy harvesting devices 164, one or more triboelectric harvesting devices 168, and/or one or more thermal energy harvesting devices 162 can be operatively positioned to harvest such energy. The wind energy harvesting devices 166 include, for example, wind turbines that are positioned outside of the facility 102 or within the facility 102 at known, suspected, or estimated locations in which there is airflow. Alternatively or in addition, one or more triboelectric harvesting devices 168 can be used in such locations. The light energy harvesting devices 161 can include photovoltaic cells, panels or arrays, photodiodes, and/or photodetectors. The light energy harvesting devices 161 can be operatively positioned within the facility (e.g., near a window or other light source) to harvest light energy. Alternatively or in addition, the light energy harvesting devices 161 can be located outside of the facility 102 to harvest light energy.

The energy harvesters 160 may receive energy from any suitable source. In one or more arrangements, the energy harvesters 160 can receive energy from one or more natural energy sources. In one or more arrangements, the energy harvesters 160 can receive energy from one or more man-made energy sources. In one or more arrangements, the energy harvesters 160 can receive energy from one or more sources located within the facility 102. In one or more arrangements, the energy harvesters 160 can receive energy from one or more sources located outside of the facility 102. Of course, the energy harvesters 160 can receive energy from any combination of the above types and/or kinds of energy sources.

The energy harvesters 160 can be used to power at least a portion of the facility sensor system 150. In one or more arrangements, the energy harvesters 160 can power the entire facility sensor system 150. In this way, the entire facility sensor system 150 can be decoupled from the main power source 130.

In one or more arrangements, the energy harvesters 160 can be used to power at least a portion of the facility sensors 152. In one or more arrangements, the energy harvesters 160 can be used to power a majority of the facility sensors 152 (e.g., at least about 60%, at least about 65%, at least about 70%, at least about 75%, at least about 80%, at least about 85%, at least about 90%, at least about 90%, etc.). In one or more arrangements, the energy harvesters 160 can be used to power all of the facility sensors 152. In this way, all of the facility sensors 152 can be decoupled from the main power source 130. Such an arrangement can, in at least some instances, allow for rapid relocation of the facility. In one or more arrangements, the energy harvesters 160 can be used to power all of the facility sensors 152 that are not integrated into and/or are not packaged with equipment, machines, etc. located within the facility 102. In one or more arrangements, the energy harvesters 160 can be used to power all or at least a majority of standalone facility sensors 152 (e.g., sensors that separate devices and/or that are readily removable from wherever they are located) located within the facility 102.

In one or more arrangements, the energy harvesters 160 can be used to power at least some of the energy availability sensors 154. In one or more arrangements, the energy harvesters 160 can be used to power a majority of the energy availability sensors 154 (e.g., at least about 60%, at least about 65%, at least about 70%, at least about 75%, at least about 80%, at least about 85%, at least about 90%, at least about 90%, etc.). In one or more arrangements, the energy harvesters 160 can be used to power all of the energy availability sensors 154. In this way, all of the energy availability sensors 154 can be decoupled from the main power source 130. In one or more arrangements, the energy harvesters 160 can be used to power other aspects of the facility sensor system 150, such as any associated transmitters, receivers, and/or transceivers.

There can be any suitable arrangements between the facility sensor system 150 and the plurality of energy harvesters 160. For instance, referring to FIG. 2, there can be a plurality of energy harvesters 160 operatively connected to a facility sensor 152. There can be a first energy harvester 160' and a second energy harvester 160". There can be additional energy harvesters 160 up to energy harvester 160‴. In such arrangements, all of the energy harvesters 160', 160", 160‴ can be configured to supply power to the facility sensors 152. In one or more arrangements, there can be one or more energy availability sensors 154 located proximate the energy harvesters 160', 160", 160‴. In one or more arrangements, the energy harvesters 160', 160", 160‴ can be always activated. In one or more arrangements, the energy harvesters 160', 160", 160‴ can be selectively activated based on the currently available energy sources.

Figure 3:
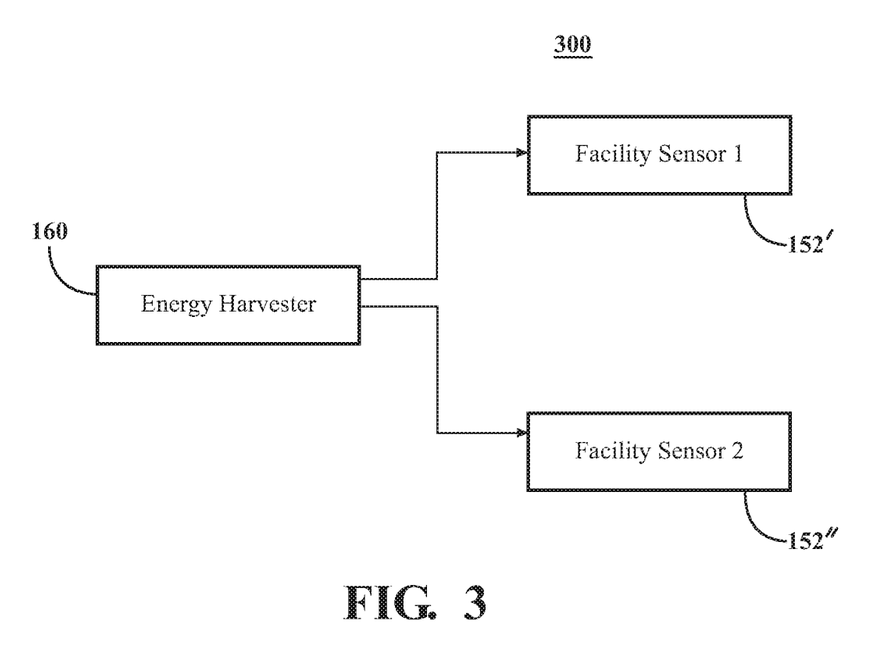
FIG. 3 is an example of an energy harvester operatively connected to supply energy to a plurality of facility sensors.

FIG. 3 shows an example of an arrangement between an energy harvester 160 and a plurality of facility sensors 152. In this example, there can be a first facility sensor 152' and a second facility sensor 152", but it will be appreciated that there can be additional facility sensors 152. Power from the energy harvester 160 can be supplied to the plurality of facility sensors 152', 152" substantially equally, unequally, or variably depending on current power needs of the individual sensors 152', 152".

In one or more arrangements, there can be only a single energy harvester 160 operatively connected to a facility sensor 152. In such case, the energy harvesters 160 can be the same, or the energy harvesters 160 can be different. In one or more arrangements, there can be a plurality of energy harvesters 160 operatively connected to a facility sensor 152. In one or more arrangements, each of the plurality of energy harvesters 160 can be different from the other plurality of energy harvesters 160. For example, each plurality of energy harvesters 160 can include a different quantity and/or different mix of types of energy harvesters 160.

In some arrangements, the plurality of energy harvesters 160 can provide the harvested electrical energy to a power management system 170. In one or more arrangements, the power management system 170 can include, for example, one or more rectifiers 172, one or more converters 174, and/or one or more energy storage devices 176. The energy storage device(s) 176 can be any component or group of components capable of receiving, storing, or generating electrical, mechanical, or thermal energy consumption. In one embodiment, the energy storage device(s) 176 can include batteries, rechargeable batteries, capacitors, energy storage flywheels that are electrically spun up, electrically pumped hydroelectric energy storage, electrically heated hot water energy storage or other device. In one or more arrangements, the energy storage device(s) 176 can be configured to receive and store electrical energy in various physical forms from the energy harvesters 160.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 120 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The system 100 can include one or more adaptive facility modules 180. The adaptive facility module(s) 180 can receive data from the facility sensor system 150 and/or any other component or group of components configured to capture information relating to the facility 102 and/or to the availability of energy sources.

The adaptive facility module(s) 180 can use such data for various purposes. For instance, in one or more arrangements, the adaptive facility module(s) 180 can be configured to analyze such data using any suitable statistical, classification, and/or assessment technique(s). The adaptive facility module(s) 180 can analyze such data to learn normal usage characteristics of the facility. The adaptive facility module(s) 180 can be configured to determine whether an adjustment to one or more controls of one or more facility systems 140 is needed based on the received facility data. Responsive to determining that an adjustment to one or more controls of one or more facility systems 140 is needed, the adaptive facility module(s) 180 can cause the one or more controls of the one or more facility systems to be modified. Non-limiting example of the controls that can be modified can include: a control setting of an HVAC system, a control setting such a temperature, speed, or flow rate of the energy storage system, a control setting of an electrical system, and/or an actuation characteristic of one or more facility systems. In one or more arrangements, the adaptive facility module(s) 180 can be configured to implement such modifications automatically.

The adaptive facility module(s) 180 can cause, directly or indirectly, one or more modifications to be made to one or more controls of the facility systems 140. As used herein, "cause" or "causing" means to make, force, compel, direct, command, instruct, and/or enable an event or action to occur or at least be in a state where such event or action may occur, either in a direct or indirect manner. The adaptive facility module(s) 180 can execute various facility functions and/or transmit data to, receive data from, interact with, and/or control the system 100 or one or more systems thereof (e.g., one or more of facility systems 140).

In some instances, the adaptive facility module(s) 180 can be configured to analyze data received from the one or more energy availability sensors 154. For example, the adaptive facility module(s) 180 can be configured to determine current available energy sources using data received from the one or more energy availability sensors. The adaptive facility module(s) 180 can be configured to select a subset of the first plurality of energy harvesters based on the determined current available energy sources. The adaptive facility module(s) 180 can be configured to cause the selected subset of the first plurality of energy harvesters to be activated.

The system 100 can include one or more actuators 190 to modify, adjust and/or alter one or more of the facility systems 140, components, characteristics, controls, parameters, and/or aspects thereof responsive to receiving signals or other inputs from the processor(s) 110 and/or the adaptive facility module(s) 180. Alternatively or in addition, one or more actuators 190 can modify, adjust and/or alter one or more components, characteristics, controls, parameters, and/or aspects of the facility 102 responsive to receiving signals or other inputs from the processor(s) 110 and/or the adaptive facility module(s) 180. The one or more actuators 190 can include motors, pneumatic actuators, hydraulic pistons, relays, solenoids, and/or piezoelectric actuators, just to name a few possibilities.

Figure 4:
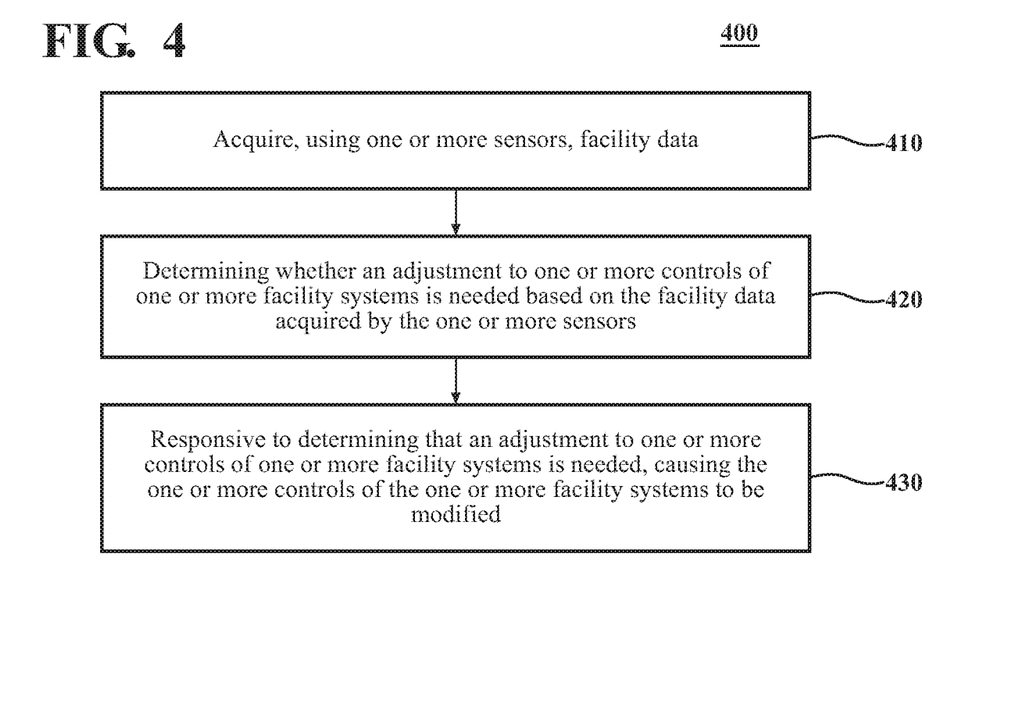
FIG. 4 is an example of a method of adaptively operating a facility.

Now that the various potential systems, devices, elements and/or components of the system 100 have been described, various associated methods will now be described. Referring now to FIG. 4, an example of a method 400 of adaptively operating a facility is shown. Various possible steps of such methods will now be described. The method 400 illustrated in FIG. 4 may be applicable to the arrangements described above in relation to FIGS. 1-3, but it is understood that the method 400 can be carried out with other suitable systems and arrangements. Moreover, the method 400 may include other steps that are not shown here, and in fact, the method 400 is not limited to including every step shown. The blocks that are illustrated here as part of the method 400 are not limited to the particular chronological order. Indeed, some of the blocks may be performed in a different order than what is shown and/or at least some of the blocks shown can occur simultaneously.

At block 410, data of at least a portion of the facility 102 and/or one or more facility systems 140 can be acquired. The facility data can be acquired by the facility sensor system 150, such as by one or more facility sensors 152. The method 400 can continue to block 420.

At block 420, an adjustment to one or more controls of one or more facility systems 140 and/or the facility 102 can be determined based on the facility data acquired by the facility sensor system 150. The determining can include any suitable data analysis. The determining can be performed by any suitable element or combination of elements of the system 100. In one or more arrangements, the determining can be performed, at least in part, by the facility sensor system 150, the processor(s) 110, and/or the adaptive facility module(s) 180. The method 400 can continue to block 430.

At block 430, responsive to determining that an adjustment to one or more controls of one or more facility systems is needed, the one or more controls of the one or more facility systems can be caused to be modified. The one or more controls can be caused to be implemented in any suitable manner. In one or more arrangements, the processor(s) 110 and/or the adaptive facility module(s) 180 can cause the system 100 to implement the driving maneuver. The processor(s) 110 and/or the adaptive facility module(s) 180 can be operatively connected to one or more of the facility systems 140 to implement the one or more controls. In one or more arrangements, the processor(s) 110 and/or the adaptive facility module(s) 180 can be operable to control the one or more actuators 190, which can cause one or more facility systems 140 to implement the one or more controls. It should be noted that causing the one or more controls of the one or more facility systems to be modified can be performed automatically. In one or more arrangements, a facility operator can be prompted to provide permission to modify the one or more controls. Responsive to receiving an input corresponding to a facility operator's approval to implement the control modifications, the one or more controls can be modified.

When the one or more controls are modified, the method 400 can end. Alternatively, the method 400 can return to block 410 or some other block. As a further alternative, the method 400 can include additional and/or alternative blocks (not shown).

Figure 5:
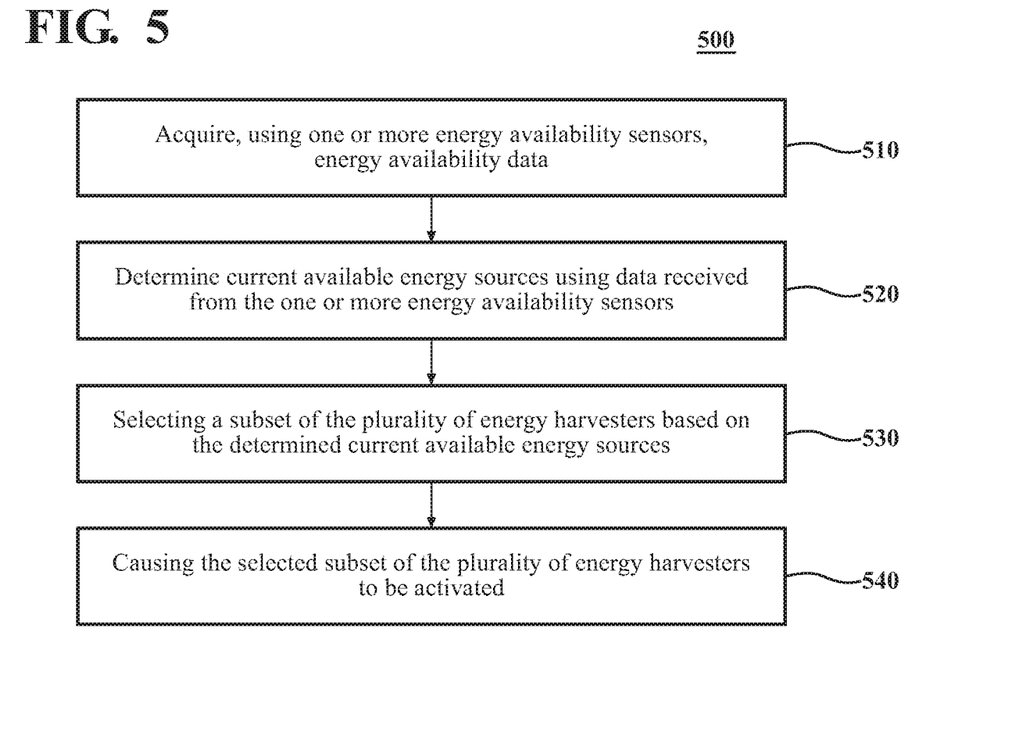
FIG. 5 is an example of a method of selectively activating energy harvesters.

Referring now to FIG. 5, an example of a method 500 of selectively activating energy harvesters 160 is shown. This method 500 can be implemented in arrangements in which a plurality of energy harvesters 160 are operatively connected to one facility sensor 152. The plurality of energy harvesters 160 can be different from each other.

Various possible steps of the method 500 will now be described. The method 500 illustrated in FIG. 5 may be applicable to the arrangements described above in relation to FIGS. 1-3, but it is understood that the method 500 can be carried out with other suitable systems and arrangements. Moreover, the method 500 may include other steps that are not shown here, and in fact, the method 500 is not limited to including every step shown. The blocks that are illustrated here as part of the method 500 are not limited to the particular chronological order. Indeed, some of the blocks may be performed in a different order than what is shown and/or at least some of the blocks shown can occur simultaneously.

At block 510, energy availability data can be acquired. The data can be acquired by the facility sensor system 150 and, more particularly, by one or more energy availability sensors 154. The data can be acquired at or near a location in which one or more energy harvesters 160 are located. The method 500 can continue to block 520.

At block 520, currently available energy sources can be determined based on data received from the one or more energy availability sensors 154. Determining the currently available energy sources can be performed by any suitable element or combination of elements of the system 100. In one or more arrangements, determining the currently available energy sources can be performed, at least in part, by the facility sensor system 150, the processor(s) 110, and/or the adaptive facility module(s) 180. The method 500 can continue to block 530.

At block 530, a subset of the plurality of energy harvesters 160 can be selected based on the determined current available energy sources. In this context, the term "subset" means less than all of the plurality of energy harvesters. Such can be performed in any suitable manner. For instance, the selecting can include those sources from which the energy available exceeds a predetermined threshold. As another example, the selecting can include the one (or two) energy sources that would provide the most power. The selecting of the plurality of energy harvesters 160 can be performed by any suitable element or combination of elements of the system 100. In one or more arrangements, the selecting can be performed, at least in part, by the facility sensor system 150, the processor(s) 110, and/or the adaptive facility module(s) 180. The method 500 can continue to block 540.

At block 540, the selected subset of the plurality of energy harvesters 160 can be caused to be activated. Such causing can include activating the selected subset of the plurality of energy harvesters 160 from an off or deactivated state. Alternatively or in addition, such causing can include deactivating or turning off one or more energy harvesters 160 that are not included in the selected subset of the plurality of energy harvesters. The selected subset of the plurality of energy harvesters 160 can be caused to be activated in any suitable manner. In one or more arrangements, the processor(s) 110 and/or the adaptive facility module(s) 180 can cause the selected subset of the plurality of energy harvesters 160 to be activated. The processor(s) 110 and/or the adaptive facility module(s) 180 can be operatively connected to one or more of the energy harvesters 160. In one or more arrangements, the processor(s) 110 and/or the adaptive facility module(s) 180 can be operable to control the one or more actuators 190, which can control one or more of the energy harvesters 160. It should be noted that causing the selected subset of the plurality of energy harvesters 160 to be activated can be performed automatically, or it can be performed in response to receiving permission from a user.

With the selected subset of energy harvesters 160 activated, the energy harvesters 160 can generate power and supply it to one or more sensors of the facility sensor system 150. The method 500 can end. Alternatively, the method 500 can return to block 510 or some other block. As a further alternative, the method 500 can include additional and/or alternative blocks (not shown).

A non-limiting example of the operation of the system 100, the method 400, and/or the method 500 will now be described. In this particular example, there can be a disaster area, such as after a hurricane or earthquake. In such case, it may be necessary to deploy mobile intelligent facilities to provide critical housing, medical care, and/or other aid to persons affected by the disaster. In such case, one or more mobile intelligent facilities can be deployed to the disaster area. For instance, the mobile facilities can be modular homes or compact pods to provide temporary housing. Power must be supplied to the facility, but it may be challenging to do so under current conditions. According to arrangements described herein, power can be supplied to the facility primarily by a mobile generator or other main power source. However, portions of the facility (e.g., one or more facility sensors and/or energy storage devices) can be powered by energy harvesters distributed on, within, outside of, under, and/or near the facility. The energy harvesters can generate electrical energy from energy received by other available sources. The system can be configured to adaptively vary which energy harvesters are used based on the current availability of other energy sources. The current availability of other energy sources can be monitored continuously, periodically, irregularly, or even randomly. The adaptive facility module 180 may then, in real-time, learn the energy consumption behaviors of the particular users of the facility and automatically adjust the day to day operation, e.g. life support systems, of the facility to maximize efficiency of the overall system 100.

It will be appreciated that arrangements described herein can provide numerous benefits, including one or more of the benefits mentioned herein. For example, by powering the facility sensor system from multiple energy sources rather than the main power source of the facility, energy efficiency can be improved. Further, arrangements described herein can be flexible to accommodate facilitates that are deployed temporarily and/or in remote locations. Arrangements described herein can facilitate rapid deployment and/or removal of a facility. Arrangements described herein can facilitate leveraging available energy sources to power the facility, thereby optimizing usage of available energy sources. Arrangements described herein can reduce load on the main power source of the facility by using other energy sources to power the facility sensor system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A facility comprising:
   a main power source;
   one or more facility systems operatively connected to the main power source;
   a plurality of sensors, the plurality of sensors being configured to acquire facility data, the plurality of sensors including a first sensor;
   a plurality of energy harvesters being configured to convert energy received in one form into another form of energy, the plurality of energy harvesters operatively connected to supply energy to the plurality of sensors, the plurality of energy harvesters including a first plurality of energy harvesters, the first plurality of energy harvesters being operatively connected to the first sensor,
   the plurality of sensors being exclusively powered by energy supplied by the plurality of energy harvesters, the first sensor being exclusively powered by energy supplied by the first plurality of energy harvesters, whereby the plurality of sensors are decoupled from the main power source;

one or more energy availability sensors; and
one or more processors, the one or more processors being operatively connected to the plurality of sensors, the one or more energy availability sensors, and the plurality of energy harvesters,
the one or more processors being configured to:
determine presently available energy sources using data received from the one or more energy availability sensors;
select a subset of the first plurality of energy harvesters based on the determined presently available energy sources; and
cause the selected subset of the first plurality of energy harvesters to be activated.

2. The facility of claim 1, wherein the one or more processors are further configured to:
determine whether an adjustment to one or more controls of one or more facility systems is needed based on the facility data acquired by the plurality of sensors; and
responsive to determining that an adjustment to one or more controls of one or more facility systems is needed, cause the one or more controls of the one or more facility systems to be modified.

3. The facility of claim 2, wherein the one or more controls of the one or more facility systems includes a control setting of an HVAC system, a control setting of an energy storage device, a control setting of an electrical system, and an actuation characteristic of one or more facility systems.

4. The facility of claim 2, wherein the plurality of sensors are operatively connected to the one or more processors wirelessly.

5. The facility of claim 2, wherein the one or more processors are at least partially powered by energy supplied by the plurality of energy harvesters.

6. The facility of claim 2, wherein the one or more processors are located remote from the facility.

7. The facility of claim 1, wherein the facility is a permanent facility.

8. The facility of claim 1, wherein the facility is a mobile facility.

9. The facility of claim 1, wherein the plurality of energy harvesters are operatively connected to supply energy to all sensors of the facility, whereby all sensors of the facility are decoupled from the main power source.

10. The facility of claim 1, wherein the plurality of energy harvesters includes a second plurality of energy harvesters, wherein the plurality of sensors further includes a second sensor, wherein the second plurality of energy harvesters are operatively connected to the second sensor, and wherein the first plurality of energy harvesters are different than the second plurality of energy harvesters.

11. The facility of claim 1, wherein at least some of the plurality of energy harvesters are located outside of the facility.

12. The facility of claim 1, wherein at least some of the plurality of energy harvesters are located inside of the facility.

13. The facility of claim 12, wherein one or more of the plurality of energy harvesters are operatively positioned to receive energy from at least one of the one or more facility systems.

14. The facility of claim 1, wherein one or more of the plurality of energy harvesters are configured to receive one of solar energy, triboelectric energy, piezoelectric energy, thermal energy, thermoelectric energy, or electromagnetic energy.

15. The facility of claim 1, wherein one or more of the plurality of energy harvesters are configured to receive energy from a natural energy source.

16. The facility of claim 1, wherein one or more of the plurality of energy harvesters are configured to receive energy from a facility system.

17. The facility of claim 1, further including one or more energy storage devices operatively connected to receive energy from at least one of the plurality of energy harvesters.

18. A system, comprising:
a mobile facility;
a main power source;
a plurality of facility systems operatively connected to the main power source;
a plurality of sensors, the plurality of sensors being configured to acquire facility data, the plurality of sensors being decoupled from the main power source, the plurality of sensors including a first sensor;
a plurality of energy harvesters operatively connected to the plurality of sensors, the plurality of energy harvesters being configured to convert energy received in one form into another form of energy, the plurality of energy harvesters including a first plurality of energy harvesters, and the first plurality of energy harvesters being operatively connected to the first sensor,
the plurality of sensors being exclusively powered by energy supplied by the plurality of energy harvesters, whereby the plurality of sensors are decoupled from the main power source;
one or more energy availability sensors; and
one or more processors, the one or more processors being operatively connected to the plurality of sensors, the one or more processors being operatively connected to the plurality of energy harvesters, and the one or more processors being operatively connected to the one or more energy availability sensors, and the one or more processors being configured to:
receive facility data from the plurality of sensors;
determine whether an adjustment to one or more controls of one or more of the plurality of facility systems is needed based on the received facility data; and
responsive to determining that an adjustment to one or more controls of one or more of the plurality of facility systems is needed, cause the one or more controls to be modified,
the one or more processors being further configured to:
determine presently available energy sources using data received from the one or more energy availability sensors;
select a subset of the first plurality of energy harvesters based on the determined presently available energy sources; and
cause the selected subset of the first plurality of energy harvesters to be activated.

19. A system, comprising:
a facility, the facility being a permanent facility;
a main power source;
one or more facility systems operatively connected to the main power source;
a plurality of sensors, the plurality of sensors being configured to acquire facility data, the plurality of sensors including a first sensor;
a plurality of energy harvesters being configured to convert energy received in one form into another form of energy, the plurality of energy harvesters operatively connected to supply energy to the plurality of sensors, the plurality of energy harvesters including a first plurality of energy harvesters, and the first plurality of energy harvesters being operatively connected to the first sensor, the plurality of sensors being exclusively powered by energy supplied by the plurality of energy harvesters, whereby the plurality of sensors are decoupled from the main power source;

one or more energy availability sensors; and one or more processors, the one or more processors being operatively connected to the plurality of sensors, the one or more energy availability sensors, and the plurality of energy harvesters, and the one or more processors being configured to:
- determine presently available energy sources using data received from the one or more energy availability sensors;
- select a subset of the first plurality of energy harvesters based on the determined presently available energy sources; and
- cause the selected subset of the first plurality of energy harvesters to be activated.

20. The system of claim 19, wherein at least one of the first plurality of energy harvesters is located outside of the facility, and wherein at least one of the first plurality of energy harvesters is located inside of the facility.

\* \* \* \* \*

UNITED STATES PATENT AND TRADEMARK OFFICE
CERTIFICATE OF CORRECTION

PATENT NO. : 10,523,007 B2
APPLICATION NO. : 15/448106
DATED : December 31, 2019
INVENTOR(S) : Ercan Mehmet Dede Page 1 of 1

It is certified that error appears in the above-identified patent and that said Letters Patent is hereby corrected as shown below:

In the Specification

Column 7, Lines 49-50: delete "up to energy harvester 160"." and insert --up to energy harvester 160".--

Column 8, Line 20: delete "thermal energy consumption." and insert --thermal energy for consumption.--

Signed and Sealed this
Eighteenth Day of February, 2020

Andrei Iancu
*Director of the United States Patent and Trademark Office*